United States Patent
Koenig

(10) Patent No.: US 9,731,908 B2
(45) Date of Patent: Aug. 15, 2017

(54) GOODS OVERTURNING UNIT, CONVEYOR HAVING THE GOODS OVERTURNING UNIT AND METHOD OF OVERTURNING GOODS

(71) Applicant: SIEMENS AKTIENGESELLSCHAFT, Munich (DE)

(72) Inventor: Frank Koenig, Bochum (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/827,472

(22) Filed: Aug. 17, 2015

(65) Prior Publication Data

US 2017/0008704 A1    Jan. 12, 2017

(30) Foreign Application Priority Data

Jul. 10, 2015   (DE) .................. 10 2015 212 949

(51) Int. Cl.
| | |
|---|---|
| *B65G 47/49* | (2006.01) |
| *G06K 15/00* | (2006.01) |
| *G06K 17/00* | (2006.01) |
| *B65G 47/252* | (2006.01) |
| *B65G 47/244* | (2006.01) |
| *B64F 1/36* | (2017.01) |

(52) U.S. Cl.
CPC ............ *B65G 47/252* (2013.01); *B64F 1/368* (2013.01); *B65G 47/244* (2013.01); *B65G 2201/0264* (2013.01)

(58) Field of Classification Search
CPC ......... B65G 47/49; G06K 17/00; G07B 15/00
USPC ........ 198/402, 403, 406, 410, 416; 414/758, 414/768, 774, 782
See application file for complete search history.

(56) References Cited

U.S. PATENT DOCUMENTS

| | | | |
|---|---|---|---|
| 3,074,530 A | 1/1963 | Rosenleaf | |
| 3,332,531 A * | 7/1967 | Chaney ............. | B65C 9/06 |
| | | | 156/DIG. 27 |
| 3,786,908 A * | 1/1974 | Jones ............. | B65G 47/244 |
| | | | 198/416 |
| 3,834,516 A * | 9/1974 | Reeser ............. | B65G 47/244 |
| | | | 198/416 |
| 3,993,187 A | 11/1976 | Knez | |
| 4,930,615 A * | 6/1990 | Nash ............. | B65G 47/244 |
| | | | 198/411 |

(Continued)

FOREIGN PATENT DOCUMENTS

| | | |
|---|---|---|
| CN | 202226372 U | 5/2012 |
| CN | 203173438 U | 9/2013 |

(Continued)

*Primary Examiner* — Douglas Hess
(74) *Attorney, Agent, or Firm* — Laurence Greenberg; Werner Stemer; Ralph Locher

(57) ABSTRACT

An overturning system is provided for a conveyor system, in particular an airport baggage conveyor system, which is suitable for transporting goods on a conveyor section. The goods can preferably be transported in the transport direction resting in a stable position on the conveyor section and, as the goods pass the conveyor section, the goods are moved into the stable position with the aid of a goods overturning unit. The goods overturning unit is divided into individual segments. The goods, which are initially in a non-stable position, are overturned into a stable position with the goods overturning unit.

14 Claims, 2 Drawing Sheets

(56) References Cited

U.S. PATENT DOCUMENTS

| | | | | |
|---|---|---|---|---|
| 5,660,262 | A | * | 8/1997 | Landrum .................. B65B 7/26 198/411 |
| 6,848,565 | B2 | * | 2/2005 | Lehmann ............... B65G 47/22 198/416 |
| 6,935,484 | B2 | * | 8/2005 | Davis .................. B65G 47/244 198/411 |
| 7,243,778 | B2 | * | 7/2007 | Christensen ....... B65G 47/1492 198/416 |
| 7,703,596 | B1 | * | 4/2010 | Grollitsch ............ B65G 47/252 193/48 |
| 8,011,493 | B2 | * | 9/2011 | Giuliani ............... B65G 47/244 198/406 |
| 8,100,252 | B2 | * | 1/2012 | Fourney ................ B65G 47/22 198/444 |
| 8,550,228 | B1 | * | 10/2013 | Wei ...................... B65G 47/244 198/411 |
| 8,700,214 | B2 | * | 4/2014 | Fortman ................ B65G 47/53 700/230 |

FOREIGN PATENT DOCUMENTS

| | | |
|---|---|---|
| CN | 203283826 U | 11/2013 |
| CN | 203781293 U | 8/2014 |
| DE | 2322380 A1 | 11/1974 |
| EP | 0962407 A1 | 12/1999 |
| WO | 2010035305 A1 | 4/2010 |

* cited by examiner

GOODS OVERTURNING UNIT, CONVEYOR HAVING THE GOODS OVERTURNING UNIT AND METHOD OF OVERTURNING GOODS

CROSS-REFERENCE TO RELATED APPLICATION

This application claims the priority, under 35 U.S.C. §119, of German application DE 10 2015 212 949.7, filed Jul. 10, 2015; the prior application is herewith incorporated by reference in its entirety.

BACKGROUND OF THE INVENTION

FIELD OF THE INVENTION

The invention relates to an overturning unit for goods and concerns the technical field of conveyor systems for goods, in particular baggage conveyor systems in airports.

Conveyor systems frequently extend over a number of levels, with goods being transported resting on a conveyor section. To overcome height differences the conveyor section can be angled, for example in the manner of a transport slide. To ensure reliable transportation it is particularly advantageous with angled conveyor sections if the goods rest in a stable position on the conveyor section. A stable position here means that the broadest face of the goods rests on the conveyor section. Any other positions are non-stable positions. Unfortunately at the check-in desk at airports for example a suitcase is generally always aligned to stand on its narrow edge, which is a much less stable position than when it is placed on one of the two broad faces.

In airport baggage conveyor systems in particular such a non-stable position is problematic, as the conveyed goods are generally suitcases or other baggage items, which frequently have wheels on their narrow face. Particularly when baggage is in a non-stable position on its wheels it can be accelerated in an uncontrolled manner in particular when the conveyor section is angled. This can cause a number of problems: baggage blockages, inability of the conveyor system to monitor the baggage, errors when transferring the baggage between conveyor section segments, in particular as a result of the wheels becoming trapped between the conveyor section segments, problems with vertical distributors and sorting machines with the possibility also of the baggage being catapulted from the conveyor system on bends. All of these things can result in failure and/or breakdown of the conveyor system.

The current prior art utilizes fixed arm suitcase overturning units, as well as suitcase overturning units with an arm spring-loaded by an air cylinder. Such solutions have little success with overturning baggage from a non-stable position into a stable position, in particular when the baggage is standing on its wheels, and also disadvantageously block light baggage in particular, with baggage labels being torn off and the possibility of baggage being damaged.

SUMMARY OF THE INVENTION

The object of the present invention is therefore to achieve greater reliability with conveyor systems by overturning goods resting on a conveyor section in a non-stable position into a stable position with a high success rate. This object is achieved by the solutions described in the independent claims.

The inventive solution provides an overturning system for a conveyor system, in particular an airport baggage conveyor system, which is provided to transport goods, in particular suitcases and other baggage items, on a conveyor section. The goods can be transported in a transport direction resting in a first position on the conveyor section; and as they pass the conveyor section, the goods experience a position change to a second position with the aid of a goods overturning unit. The goods overturning unit is divided into individual segments, with at least some of the segments colliding with the goods along the transport direction.

In order to move the goods reliably and in a particularly simple manner into their stable position according to an advantageous embodiment, the segments of the goods overturning unit can overturn the goods with the aid of their inertia.

In order to allow an advantageous embodiment in which primarily the goods that are still in a non-stable position before passing the goods overturning unit and not the goods that are already in a stable position can interact with the overturning system, the segments can be arranged above the conveyor section.

According to one embodiment the segments can be pendulums. As a result the goods are overturned as a consequence of the segments swinging back due to the influence of gravity, with the segments first being deflected slightly in a goods transport direction. This variant assumes that the goods themselves cause the segments to make a pendulum movement as a result of their advance by way of the resulting collision, with the overturning of the goods resulting from the impact of the pendulum with the goods and/or the pendulum swinging back against the goods.

In order according to a further embodiment to allow a gentle interaction between the pendulum and the goods, a weighted mass of the pendulum can be spherical or trapezoidal or pear-shaped. The bodies therefore do not have to have strict rotational symmetry or a constant surface profile (constant in the sense of a mathematically derivable surface profile). This latter variant has the particular advantage compared with a spherical configuration that if it is inadvertently detached, there is no hazard due to the rolling sphere. It should be noted here in particular that such transport systems very frequently have sloping section segments, such as slides, carousels, on which a detached sphere may reach very high speeds, thereby endangering people and goods. In contrast a trapezoidal or pear-shaped body, when detached, wobbles or spins about its rotation axis (longitudinal axis) which is at an angle to the horizontal, thereby representing a significantly much smaller risk of danger.

In order to allow optimum alignment of the segments in the conveyor system, according to one embodiment the segments can be arranged along a transport direction and/or along a breadth of the conveyor section. The segments can thus be arranged in such a manner that they are distributed over the breadth of the conveyor section, ensuring that the transported goods collide with at least some of the segments.

According to one embodiment, movement of the segments can be provided in such a manner that the pendulum movement always has a component perpendicular to the transport direction and/or to the longitudinal axis of the goods, so that the pendulum body always has a movement component in a direction parallel to the surface normal of the broad face of the goods, for example the suitcase. This means that the segments can only execute minor ineffective evasive movements so the full force of their weight is used to overturn the goods.

To ensure that not too much force is applied to the goods, which could damage them, according to one embodiment the mass of the segments can be determined by the force required to overturn the goods.

As far as a method is concerned, the object cited above is achieved according to the invention by a method for overturning goods with an overturning system for a conveyor system, in particular an airport baggage conveyor system, which is suitable for transporting goods on a conveyor section. The method includes:
a) supplying a goods overturning unit divided into individual segments, the segments being arranged to collide with the goods transported along the conveyor section;
b) transporting the goods resting on the conveyor section in a transport direction; and
c) the goods interacting with at least some of the segments of the goods overturning unit, so that after the interaction the goods are in an overturned position.

According to one embodiment of the method the goods can be in a non-stable position before the interaction with the goods overturning unit. This allows the goods to be overturned with the aid of the method. In other words before the interaction with the goods overturning unit the goods are in a first position and after the interaction in the overturned position they are aligned in a more stable manner in respect of transportation than in the first position. For a suitcase for example this means that it is overturned from a standing position (generally on the edge provided with wheels on one side at least) to a lying position (generally on one of the two broad suitcase faces) during transportation.

In order for the smallest possible force to be applied to individual subregions of the goods and thus to minimize the risk of the goods being damaged, according to one advantageous embodiment the segments of the goods overturning unit can interact approximately simultaneously with goods.

According to one embodiment the mass of the segments can be selected as a function of the force required to overturn the goods. Therefore the force acting on the goods is no greater than that required to overturn the goods, thereby minimizing the risk of damage to the goods due to excessive force still further. It is advantageous here if the segments are embodied as pendulums and have spherical or trapezoidal or pear-shaped pendulum bodies.

Other features which are considered as characteristic for the invention are set forth in the appended claims.

Although the invention is illustrated and described herein as embodied in a goods overturning unit, a conveyor having a goods overturning unit and a method of overturning goods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
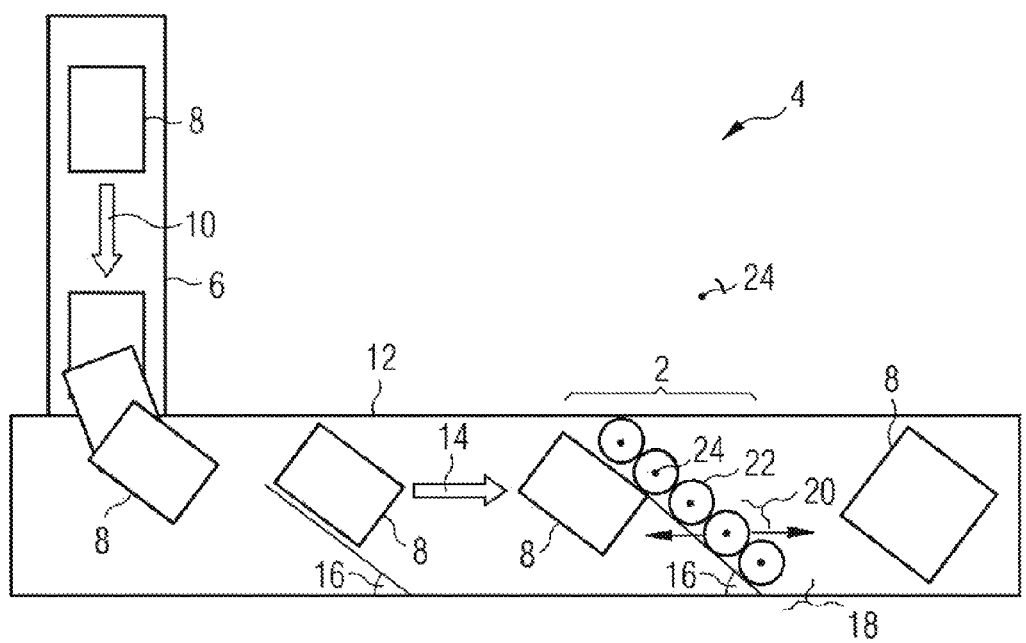
FIG. 1 is a schematic plan view of a detail of a conveyor system with an overturning system according to the invention.

Referring now to the figures of the drawings in detail and first, particularly to FIG. 1 thereof, there is shown a schematic plan view of a detail of an overturning system 2 for a conveyor system 4, in particular an airport baggage conveyor system, according to a preferred embodiment of the invention. The conveyor system 4 is suitable for transporting suitcases and other baggage items, referred to herein as goods 8, on a conveyor section 12. The conveyor system 4 contains a loading conveyor section 6, on which goods 8, which are initially in a non-stable position (e.g. standing suitcases), are transported in the loading transport direction 10. A stable position, in which all goods 8 should preferably be transported, is when the broadest face of the goods 8 rests on the conveyor section 12. All other positions are non-stable positions. The goods 8 are aligned with their side edges approximately parallel to the loading transport direction 10. The loading conveyor section 6 meets the conveyor section 12 of an overturning system 2, on which the goods 8 rest to be transported further in a transport direction 14, essentially orthogonally. The goods 8 change direction, as a result of which they are no longer aligned with their side edges on the conveyor section 12 along the transport direction 14, but are at an angle 16. As the direction change is approximately orthogonal, the angle 16 is around 45°, but other angles 16 are also possible for other direction changes. Conveyor section 12 and loading conveyor section 6 can comprise drive devices, for example roller tracks and/or conveyor belts, to allow the active transportation of goods 8 in a different manner.

As they pass the conveyor section 12, the goods 8 are moved into the stable position with the aid of a goods overturning unit 18. The goods overturning unit 18 is divided into individual segments 20. As on the loading conveyor section 6, before the interaction with a goods overturning unit 18 the goods 8 are still in a non-stable position, so overturning of the goods 8 only takes place with a method for overturning goods 8 using a goods overturning unit 18 divided into individual segments 20. The goods 8 resting on the conveyor section 12 are first transported in the transport direction 14. The goods 8 then interact with the goods overturning unit 18, so that after the interaction the goods 8 are in a stable position. After the method has been performed the goods 8 are therefore no longer in a non-stable position.

The segments 20 are arranged in such a manner that they are distributed along the transport direction 14 and over the breadth of the conveyor section 12. The goods overturning unit 18 here is at the same angle 16 as the goods 8 and is therefore aligned optimally with the conveyor section 12. When the goods 8 pass the goods overturning unit 18, the segments 20 of the goods overturning unit 18 can therefore interact approximately simultaneously with the goods 8. The segments 20 therefore only apply a small force to individual subregions of the goods 8, thereby minimizing the risk of damage to the goods 8. The mass of the segments 20 is selected as a function of the force required to overturn the goods 8. This once again ensures that the force applied to the goods 8 is only as strong as necessary, thereby minimizing damage.

The segments 20 of the goods overturning unit 18 overturn the goods 8 with the aid of their inertia and thereby move them into their stable position. The segments 20 here are configured as pendulums. The goods 8 are therefore overturned as a result of the collision with the pendulum body of the pendulum and/or as a result of the pendulum swinging back due to the influence of gravity. However the segments 20 are first deflected slightly in the transport direction 14 by the transported goods 8 themselves. Because a weighted mass of the pendulum is spherical (see FIG. 2), the interaction with the goods 8 is very gentle. Blocking rarely occurs with a spherical pendulum body 22. The mass of the segments 20 and therefore here the weighted mass of the pendulum are determined by the force required to overturn the goods 8. The segments 20 are therefore definitely heavy enough to ensure that the goods 8 are overturned but no more force is applied to them than necessary. In the case of airport baggage conveyor systems five pendulum bodies with a polyurethane mass of just over seven kilograms each with a suspension unit 24 in the form of a forklift chain have proven advantageous.

Movement of the segments 20 along the transport direction 14 is greatly preferable, this including movement in and counter to the transport direction 14. This means that the segments 20 can only execute minor lateral evasive movements and the transfer of force to the goods 8 is very efficient.

Figure 2:
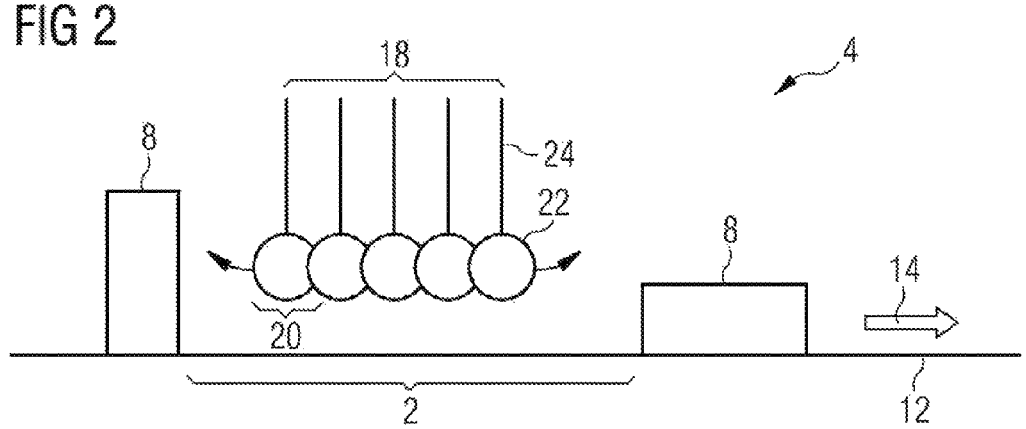
FIG. 2 is a side view of the overturning system illustrated in FIG. 1.

FIG. 2 shows a side view of the overturning system 2 illustrated in FIG. 1 according to a preferred embodiment of the invention. The individual pendulums are each fastened to a suspension unit 24, the suspension unit 24 only acting at one point of the spherical pendulum body 22. The segments 20, in this instance the pendulums, are arranged above the conveyor section 12. The arrangement is preferably positioned at a height at which there is no contact with goods 8 already in a stable position.

As illustrated in FIG. 1 goods 8 are generally in a non-stable position before they pass the overturning system 2. This is typically due to the alignment of the goods 8 during check-in, when the goods 8 are generally aligned to stand on the narrow edge. The goods 8 are conveyed by the conveyor section 12 in the transport direction 14, applying force to the goods overturning unit 18, as a result of which it is deflected and then overturns the goods 8 so that they are conveyed in a stable position.

Figure 3:
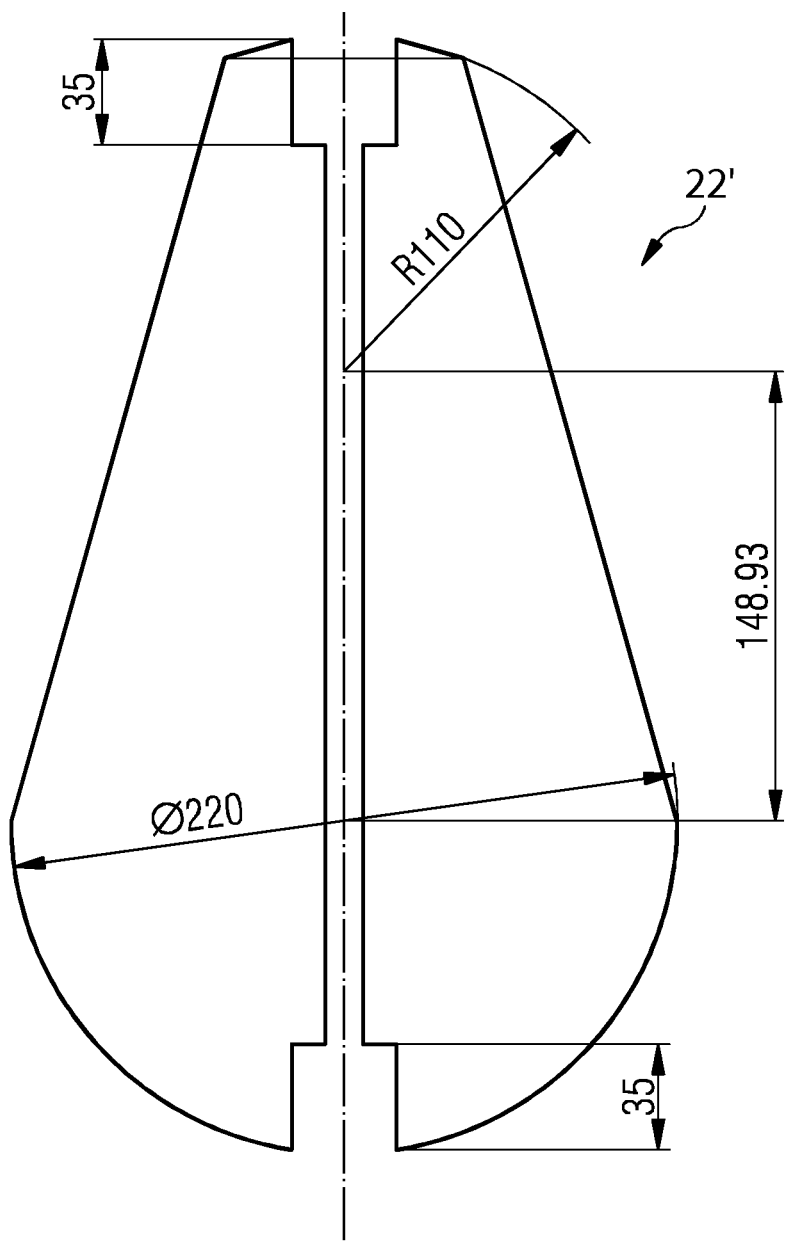
FIG. 3 is a sectional view through a trapezoidal pendulum body for use in the overturning system illustrated in FIG. 2.

FIG. 3 shows a modified configuration of the pendulum body 22 compared with the one in FIG. 2. The modified pendulum body 22' is configured here as trapezoidal or even pear-shaped. The pendulum bodies 22, 22' here do not have to have strict rotational symmetry or a constant surface profile (constant in the sense of a mathematically derivable surface profile). The variant illustrated in FIG. 3 has the particular advantage compared with a spherical configuration that if it is inadvertently detached, there is no hazard due to the rolling sphere. It should be noted here in particular that such transport systems very frequently have sloping section segments, such as slides, carousels, on which a detached sphere may reach very high speeds, thereby endangering people and goods. In contrast a trapezoidal or pear-shaped body, when detached, wobbles or spins about its rotation axis (longitudinal axis) which is at an angle to the horizontal, thereby representing a significantly much smaller risk of danger. A cylindrical pendulum body would also be conceivable, as, if detached, it can only become dangerous if its longitudinal axis is aligned exactly perpendicular to the fall line. Otherwise it rolls to one side of the falling segment, aligning its longitudinal axis parallel to the fall direction.

The following is a summary list of reference numerals and the corresponding structure used in the above description of the invention:
2 Overturning system
4 Conveyor system
6 Loading conveyor section
8 Goods
10 Loading transport direction
12 Conveyor section
14 Transport direction
16 Angle
18 Goods overturning unit
20 Segment
22 Spherical pendulum body
22' Trapezoidal or pear-shaped pendulum body
24 Suspension unit

The invention claimed is:

1. An overturning system for a conveyor system suitable for transporting goods on a conveyor section, the overturning system comprising:
a goods overturning unit, the goods being transported in a transport direction resting in a first position on the conveyor section and as the goods pass the conveyor section, the goods experience a position change into a second position with an aid of said goods overturning unit, said goods overturning unit being divided into individual segments, with at least some of said segments colliding with the goods along the transport direction, said segments being configured as simple pendulums each having a bob and a suspension unit where a center of mass of said pendulums resides in said bob.

2. The overturning system according to claim 1, wherein said segments of said goods overturning unit overturn the goods into the second position with an aid of inertia of said segments.

3. The overturning system according to claim 1, wherein said segments are disposed above the conveyor section.

4. The overturning system according to claim 1, wherein said bob is a weighted mass weighing over seven kilograms and is pear-shaped.

5. The overturning system according to claim 1, wherein said segments are disposed such that said segments are distributed along the transport direction and/or over a breadth of the conveyor section.

6. The overturning system according to claim 1, wherein said segments are disposed such that a movement component of said segments perpendicular to the transport direction can be achieved by a collision with the goods.

7. The overturning system according to claim 1, wherein a mass of said segments is determined by a force required to overturn the goods.

8. A method for overturning goods with an overturning system for a conveyor system being suitable for transporting goods on a conveyor section, which comprises the following steps of:
supplying a goods overturning unit divided into individual segments, the segments being disposed so as to collide with the goods transported along the conveyor sections, the individual segments being configured as simple pendulums each having a bob and a suspension unit where a center of mass of said pendulums resides in said bob; and
transporting the goods resting on the conveyor section in a transport direction and the goods interacting with at least some of the segments of the goods overturning unit, so that after the interacting the goods are in an overturned position, wherein before an interaction with the goods overturning unit the goods are in a first position and in the overturned position they are in a more stable position in respect of transportation than the first position.

9. The method according to claim 8, wherein the segments of the goods overturning unit interact approximately simultaneously with the goods.

10. The method according to claim 8, which further comprises selecting a mass of the segments in dependence on a force required to overturn the goods.

11. The method according to claim 8, which further comprises forming the bob as a pear shaped body with a weight of at least seven kilograms.

12. A conveyor system, comprising:
   a conveyor section for transporting goods and defining a transport direction of the goods;
   a goods overturning unit disposed above said conveyor section, the goods being transported in the transport direction resting in a first position on said conveyor section and as the goods pass said conveyor section, the goods experience a position change into a second position with an aid of said goods overturning unit, said goods overturning unit being divided into individual segments, with at least some of said segments colliding with the goods along the transport direction, said segments being configured as simple pendulums each having a bob and a suspension unit where a center of mass of said pendulums resides in said bob.

13. The conveyor system according to claim 12, wherein said conveyor section is configured to transport baggage.

14. The conveyor system according to claim 12, wherein the conveyor system is an airport baggage conveyor system.

* * * * *